United States Patent [19]

Clarkson et al.

[11] Patent Number: 5,553,197
[45] Date of Patent: Sep. 3, 1996

[54] DEVICES FOR USE IN NEURAL PROCESSING

[75] Inventors: Trevor G. Clarkson; John G. Taylor, both of London, United Kingdom

[73] Assignees: University College London; King's College London, both of London, England

[21] Appl. No.: 167,884

[22] PCT Filed: Jun. 17, 1992

[86] PCT No.: PCT/GB92/01086

§ 371 Date: Feb. 18, 1994

§ 102(e) Date: Feb. 18, 1994

[87] PCT Pub. No.: WO93/00654

PCT Pub. Date: Jan. 7, 1993

[30] Foreign Application Priority Data

Jun. 21, 1991 [GB] United Kingdom ............... 9113554
Mar. 11, 1992 [GB] United Kingdom ............... 9205319
Jun. 5, 1992 [GB] United Kingdom ............... 9211909

[51] Int. Cl.⁶ .................................................. G06F 15/18
[52] U.S. Cl. ............................................ 395/27; 395/22
[58] Field of Search ..................................... 395/27, 22

[56] References Cited

U.S. PATENT DOCUMENTS

| | | | |
|---|---|---|---|
| 3,250,918 | 5/1966 | McGrogan, Jr. | 395/24 |
| 4,989,256 | 11/1991 | Buckley | 395/27 |
| 5,063,521 | 11/1991 | Peterson et al. | 395/27 |
| 5,091,864 | 2/1992 | Baji et al. | 395/27 |
| 5,151,971 | 9/1992 | Jousselin et al. | 395/27 |
| 5,165,009 | 11/1992 | Watanabe et al. | 395/27 |
| 5,167,009 | 11/1992 | Skeirik | 395/22 |
| 5,175,798 | 12/1992 | Taylor et al. | 395/20 |
| 5,197,114 | 3/1993 | Skeirik | 395/22 |
| 5,293,459 | 3/1994 | Duranton et al. | 395/27 |

FOREIGN PATENT DOCUMENTS

0422659-A2 10/1989 European Pat. Off. .

OTHER PUBLICATIONS

Taylor et al, "Temporal Pattern and Leaky Integrator Neurons", IEEE Inter. Neural Netword Conf., Jul. 1990.
Myers et al, "Output Functions for probability Logic Nodes", IEE 1st Conf. on Artificial Neural Networks, 1989.
Clarkson et al, "Hardware Realisable Models of Neural Processing", IEE Artificial Neural Networks, 1989.
Clarkson et al, "PRAM Automata", IEEE Inter. Workshop on Cellular Neural Networks and their applications, 16'19 Dec. 1990.
Sicherheit durch Qualität (Elektronik 25, 1990).

Primary Examiner—George B. Davis
Attorney, Agent, or Firm—Darby & Darby, P.C.

[57] ABSTRACT

A device for use in neural processing comprises a plurality of probabilistic RAMs (pRAMs). The output of the pRAMs are connected in common to means for accumulating their output signals and for decaying the result of the accumulation. A thresholding circuit receives the decayed result at its input and produces an output signal when the decayed result exceeds a predetermined level.

10 Claims, 5 Drawing Sheets

DEVICES FOR USE IN NEURAL PROCESSING

BACKGROUND OF THE INVENTION

This invention relates to artificial neuron-like devices (hereinafter referred to simply as "neurons") for use in neural processing.

One of the known ways of realising a neuron in practice is to use a random access memory (RAM). The use of RAMs for this purpose dates back a considerable number of years. It has been suggested that if one were able to construct a RAM in which a given output, say a '1', was produced by a given storage location with a probability between 0 and 1 (rather than with a probability of either 0 or 1 as in a conventional RAM), such a RAM would have a potential for constructing neural networks which mimicked more closely than hitherto the behaviour of physiological networks. (See Gorse, D., and Taylor, J. G., 1988, Phys. Lett. A. 131, 326–332; Gorse, D., and Taylor, J. G., 1989, Physica D, 34, 90–114). The term "pRAM", an abbreviation for "probabilistic RAM", is used there and herein for a RAM in which a given output is produced with a given probability between 0 and 1 when a particular storage location in the RAM is addressed, rather than with a probability of either 0 or 1 as in a conventional RAM.

In International Patent Applications Nos. WO92/00572 and WO92/00573, and in a paper entitled "Hardware realisable models of neural processing", published in Proceedings of the first IEE International Conference on Artificial Neural Networks, 1989, pp 242–246 there is a description of how a pRAM may be constructed. There is described a device for use in a neural processing network, comprising a memory having a plurality of storage locations at each of which a number representing a probability is stored; means for selectively addressing each of the storage locations to cause the contents of the location to be read to an input of a comparator; a noise generator for inputting to the comparator a random number representing noise; and means for causing to appear at an output of the comparator an output signal having a first or second value depending on the values of the numbers received from the addressed storage location and the noise generator, the probability of the output signal having a given one of the first and second values being determined by the number at the addressed location.

OBJECT AND SUMMARY OF THE INVENTION

It is an object of the present invention to provide a novel neuron in which the effect of time on the output thereof is incorporated in a form which at least approximates what is currently understood to be the case with biological neurons, whilst also incorporating stochastic properties.

According to the present invention there is provided a neural device which comprises a plurality of neural elements each of which has a memory having a plurality of storage locations at each of which locations a number representing a probability is stored, means for addressing the storage locations, and means for causing to appear at the output of the element, when the storage locations are addressed, an element output signal, the probability of the output signal having a given one of first and second values being determined by the number at the addressed location, the neural elements having their outputs connected in common to means for accumulating the output signals thereof and for decaying the result of the accumulation; and thresholding means for receiving at its input the decayed result and generating an output signal at its output when the said decayed result exceeds a predetermined level.

The pRAMs may be 1-pRAMs, that is to say they have a single address input line and thus two addresses, corresponding respectively to a 0 and a 1 as the input address, and two storage locations, one for each address. Alternatively, however, the pRAMs may have a plurality of address lines, for example they may be 2-pRAMs, i.e. each pRAM has two address lines.

The temporal modelling of biological neurons is normally based on the Leaky Integrator model by Hodgin & Huxley, (Hodgin A. L. and Huxley A. F., J Physiol. (London) 117, 500, 1952). In the devices described herein the addition of pRAMs in the leaky integrator model gives the benefit of modelling synaptic noise.

DESCRIPTION OF THE PREFERRED EMBODIMENT

Figure 1:
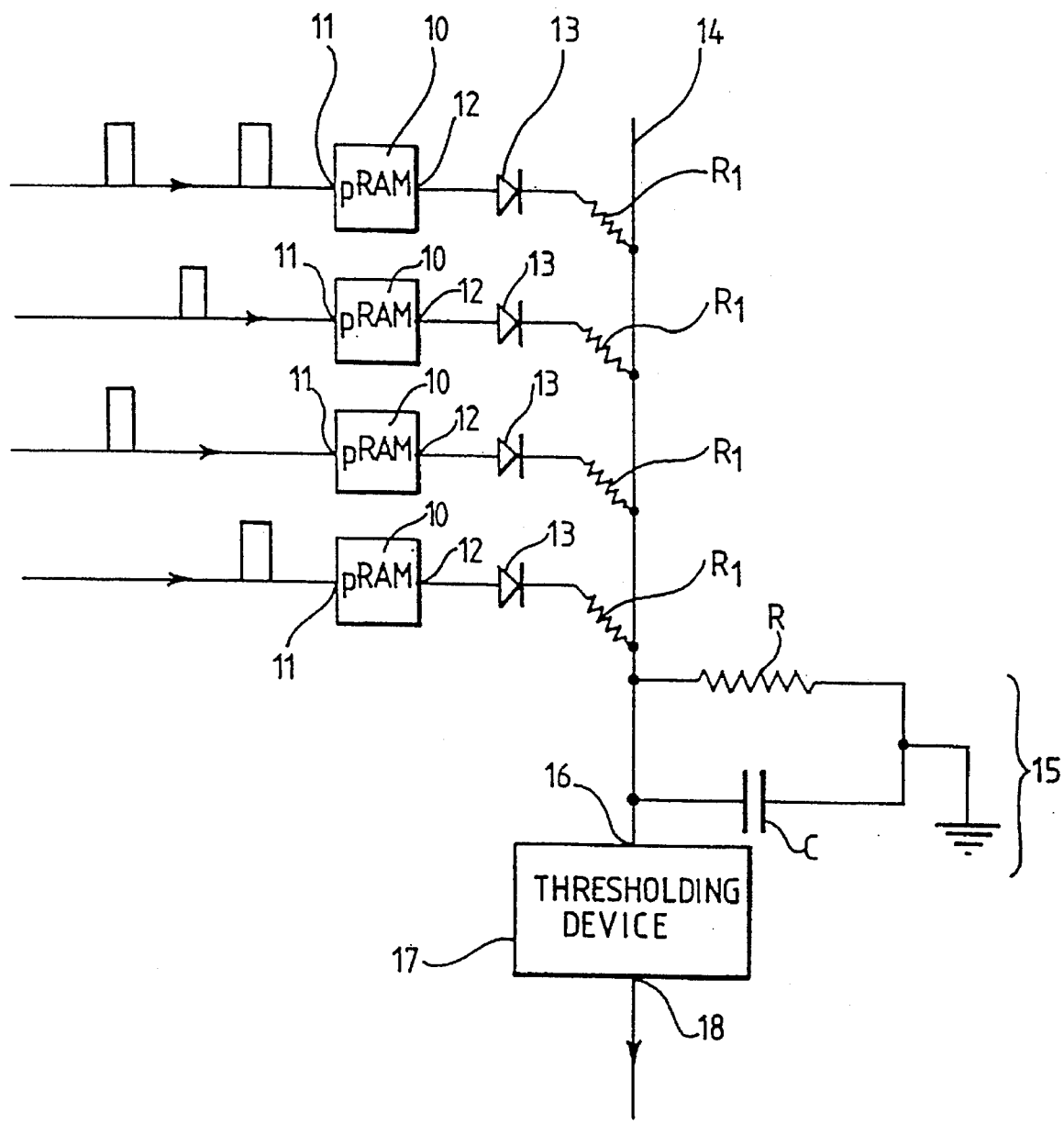
FIG. 1 shows an embodiment of the invention using 1pRAMs.

The embodiment of the invention shown in FIG. 1 comprises four 1-pRAMs 10, though there is no particular significance in the use of four, and more or less than four could be used. Each pRAM has two storage locations each of which holds a number representing a probability $\alpha$. The two values are referred to below as $\alpha_0$ and $\alpha_1$. The values of $\alpha_0$ and $\alpha_1$ in each pRAM are independent of the values of $\alpha_0$ and $\alpha_1$ in each other pRAM. As is explained in the IEE paper and the International Patent Applications identified above, the probability of a 1 appearing at the output of the pRAM when a given storage location is addressed is equal to the value of $\alpha$ stored at that location. Thus, for example, if a given storage location holds a value of $\alpha=0.7$, the probability of a 1 appearing at the output of the pRAM concerned when that location is addressed is 0.7 and the probability of a 0 is 0.3.

Each pRAM has a single address input 11, and the four inputs receive trains of pulses. Each pulse train can be used to represent a real number $n=[0,1]$, i.e. a number from 0 to 1, with the probability of there being a 1 as opposed to a 0 being equal to the number n.

The output 12 of each pRAM, which is a 0 or 1, passes via a respective diode 13 and resistor $R_1$, to a line 14. The diodes 13 are there to prevent current leaking back through the pRAMs during voltage decay (see below), but an alternative means could be used, for example solid state switches open only at the instants pulses are produced at the pRAM outputs. The resistors RAM, are conveniently all of the same value, though this is not essential. As an alternative to the resistors $R_1$, other means could be used, for example capacitors or transmission lines.

A voltage decay circuit 15 is connected across the line 14. This can suitably comprise a resistor R and a capacitor C. The line is further connected to the input 16 of a thresholding device 17. This generates a pulse representing a 1 at its output 18 each time the voltage at its input 16 goes from a value less than a predetermined threshold value to a value greater than the threshold value. The device 17 may for example, be in the form of a Schmitt trigger plus a monostable, producing pulses of fixed width. The pulses at the output of the device can be applied to the inputs of other neurons or to external devices.

Figure 2A:
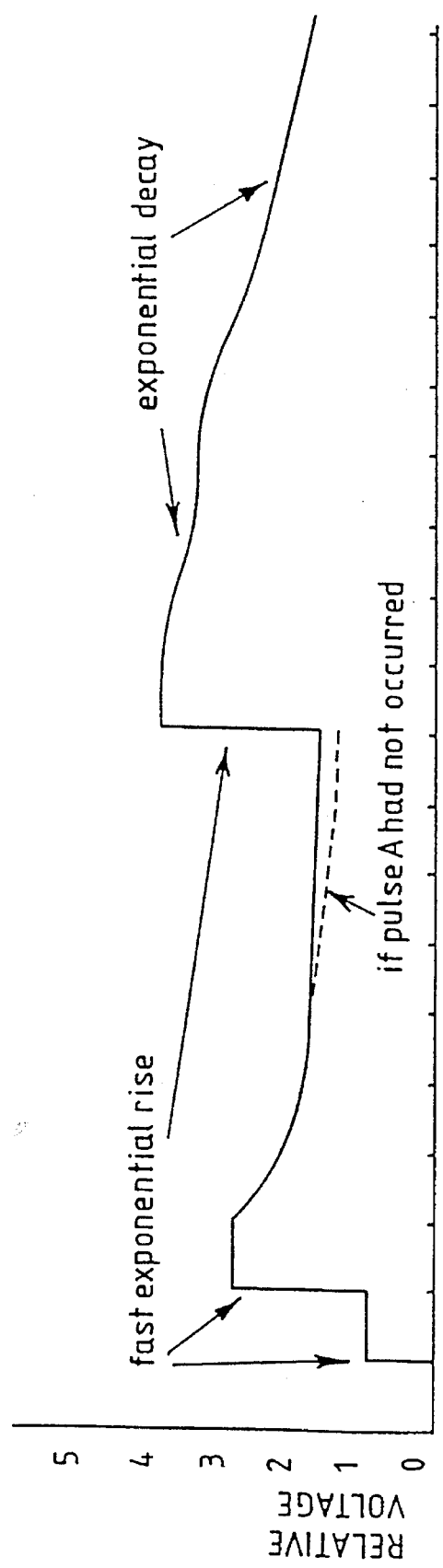
FIG. 2A is a plot of the voltage at the input of the thresholding device in FIG. 1, against time.
Figure 2B:
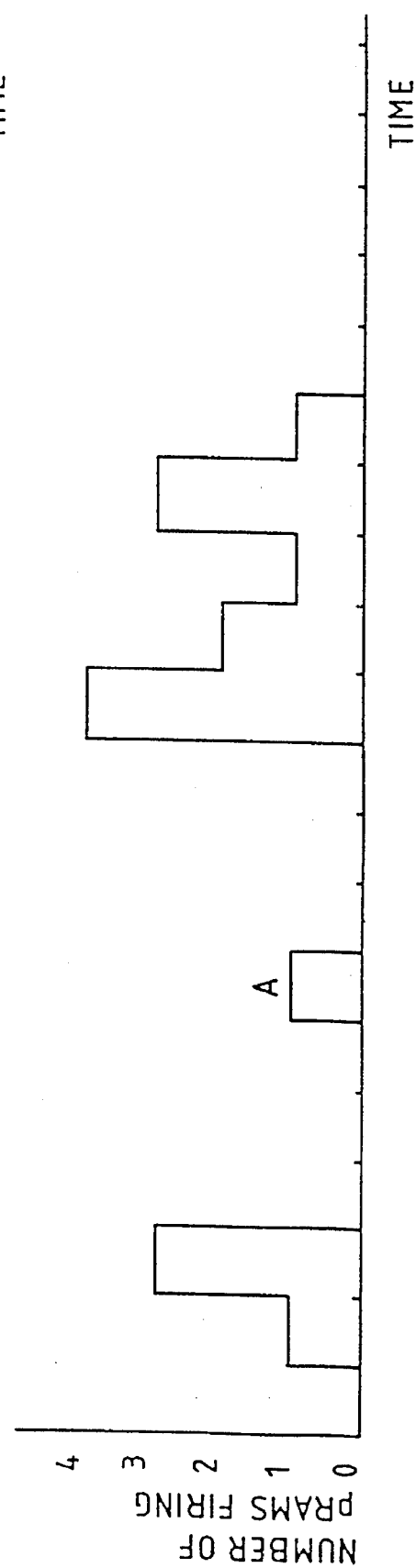
FIG. 2B is a graph showing the number of pRAMs which are firing.

Suppose, by way of example, that the pulses at the outputs 12 which represent 1's are voltage pulses of an amplitude of 1 volt The initial current which the pRAMs can apply to the input 16 of the device 17 is therefore 0, $1/R_1$, $2/R_1$, $3/R_1$, or $4/R_1$ amps, depending on how many pRAMs have a 1 at their output and how many have a 0. This current develops a voltage which decays over time as a result of the decay circuit 15, but can be increased or caused to decay more slowly as further voltage pulses arrive at the input 16. An example of this is shown in FIG. 2 of the accompanying drawings. The top graph in FIG. 2 is a plot of the voltage at the input 16 versus time, and the bottom graph shows the number of pRAMs which are firing, i.e. have a 1 at their output, to produce this result.

The neuron described above has no provision for learning. However, this can be incorporated by training for the values of $\alpha_0$ and $\alpha_1$ in each pRAM. Also, resistances RAM correspond to the post-synaptic weights and may therefore be modified during training. The methods by which the training of the pRAM memory contents or the post-synaptic effects, $R_1$, may be performed include reinforcement learning, gradient descent, back-propagation, Kohonen topographic maps and Hebbian learning, all of which are established techniques in the field of neural networks.

The values for R and C are chosen to give a suitable decay rate, for example so that the value of 1/RC is of the order of 10–100 times the clock rate of the pulses being applied to the inputs of the pRAMs. This gives an effect broadly equivalent to what is believed to occur at the leaky membrane in biological neurons. However, other decay rates may be used if more appropriate for the particular purpose in hand. As already mentioned, the resistances $R_1$, provide the equivalent of post-synaptic weights in biological neurons. The values of $\alpha_0$ and $\alpha_1$ provide the equivalent of pre-synaptic weights in biological neurons.

Figure 3:
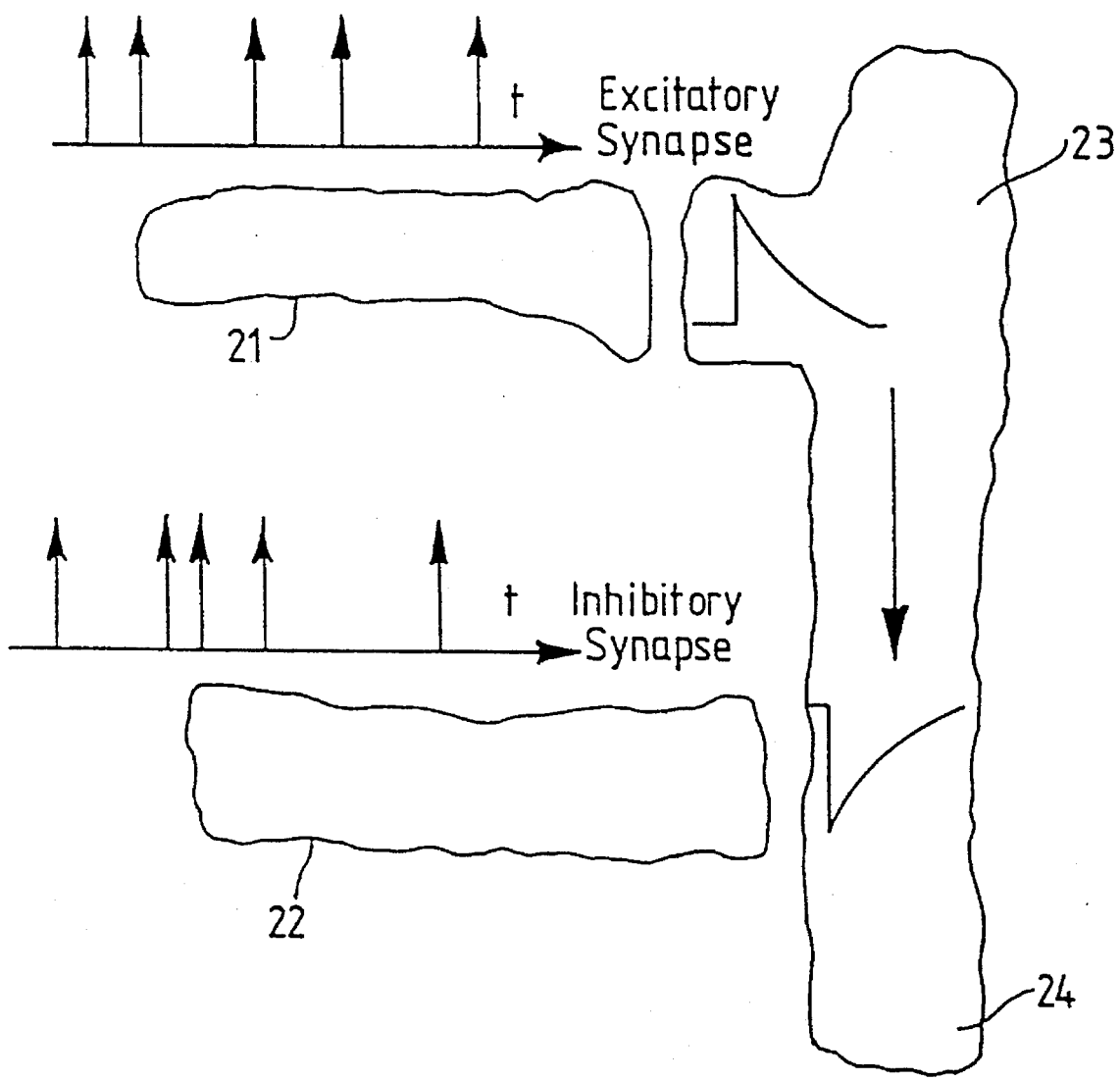
FIG. 3 shows diagrammatically an aspect of the way in which biological neurons act.

It should be emphasised that there is no suggestion that the neuron described herein operates in precisely the same way as a biological neuron, and indeed the operation of the latter is far from completely understood. However, it is known that a biological neuron operates in digital and analogue fashions. Nerve impulses correspond to a digital form of information transmitted between neurons, but the encoded information is an analogue value, i.e. an impulse density. Synapses can either be excitatory or inhibitory. The way in which biological neurons use excitatory or inhibitory synapses is shown in FIG. 3. Here, the post-synaptic potential 23 of synapse 21 may be inhibited or reduced in amplitude by synapse 22 so that the combined post-synaptic potential 24 is reduced. For excitatory action, the post-synaptic potential 23 of synapse 21 may be enhanced or increased in amplitude by synapse 22 so that the combined post-synaptic potential 24 is strengthened.

Figure 4:
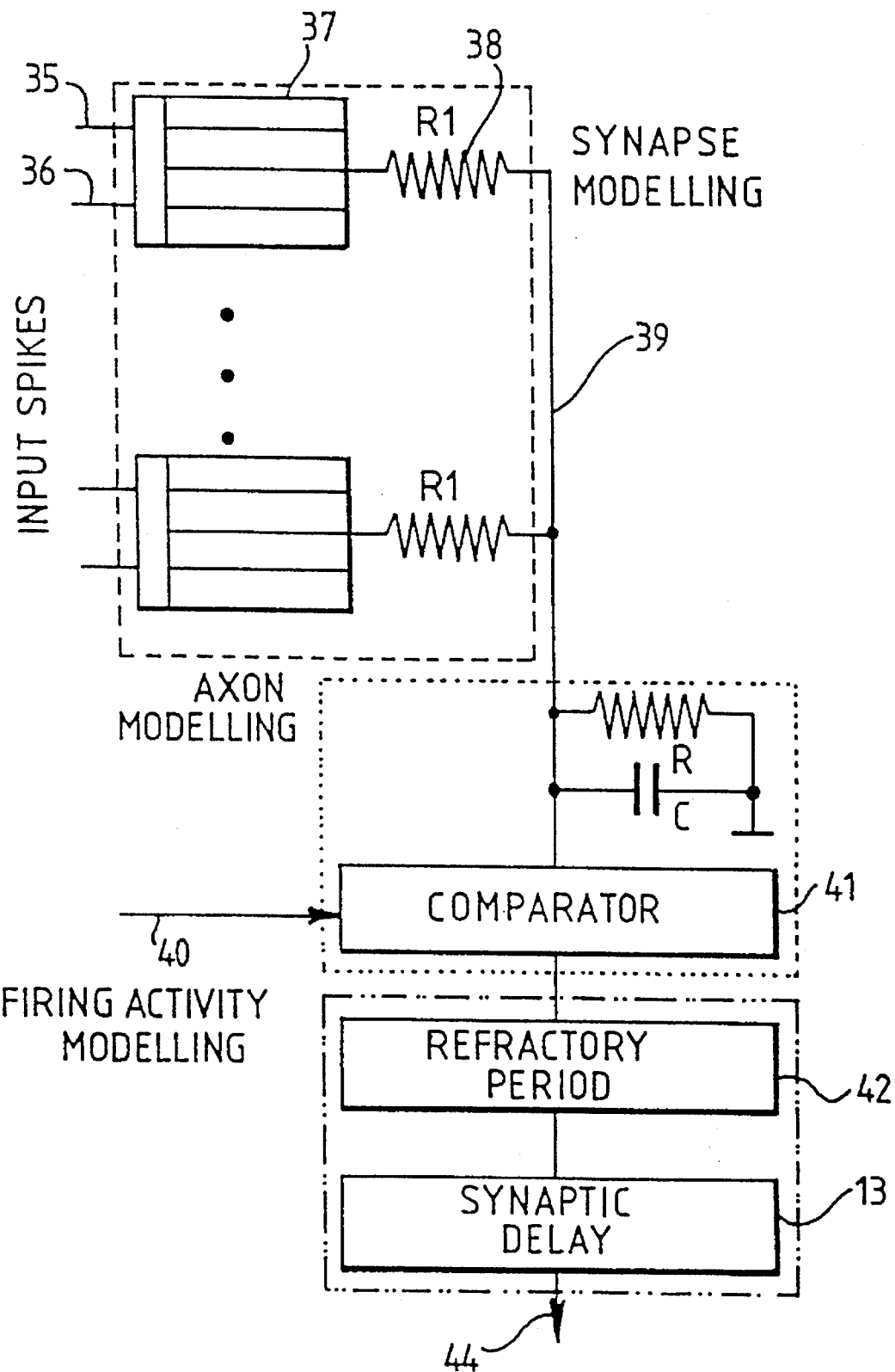
FIG. 4 shows a second embodiment of the invention using 2-pRAMs.

A similar action is exhibited by the embodiment of artificial neuron shown in FIG. 4. This uses 2-pRAMs to add further non-linearity. However, although the use of 2-pRAMs is described, any number of inputs may be used for each pRAM to increase the degree of non-linearity. The two inputs 35 and 36 are used to select one of the four memory contents of the pRAM which determine the firing probability of the synapse. In Table 1, the firing probability of the pRAM synapse when input 35 is active (a '1' logic level) may be decreased when there is activity of input 36. This corresponds to inhibitory action. In Table 2, the firing probability of the pRAM synapse when input 35 is active may be increased when there is activity of input 36. This corresponds to excitatory action.

When any of the pRAM synapses of FIG. 4 fires, their post-synaptic potential passes through a resistance 38 ($R_1$). The resistances, $R_1$, as already mentioned, correspond to the post-synaptic weights, and, like the pRAM memory contents, may be modified during training.

When a combined post-synaptic potential 39 in FIG. 4 exceeds a threshold level 40 a comparator 41 will generate a logic '1' output. The output of comparator 41 is zero otherwise. In order to reduce the firing rate of a neuron and the overall activity of a network in which it is used, a refractory period 42 commences whenever a neuron fires, i.e. generates a logic '1' at the neuron output 44. During the refractory period, the neuron is prevented from firing again. Once the refractory period has elapsed, the neuron may fire again when the post-synaptic potential 39 is above the threshold.

Figure 5:
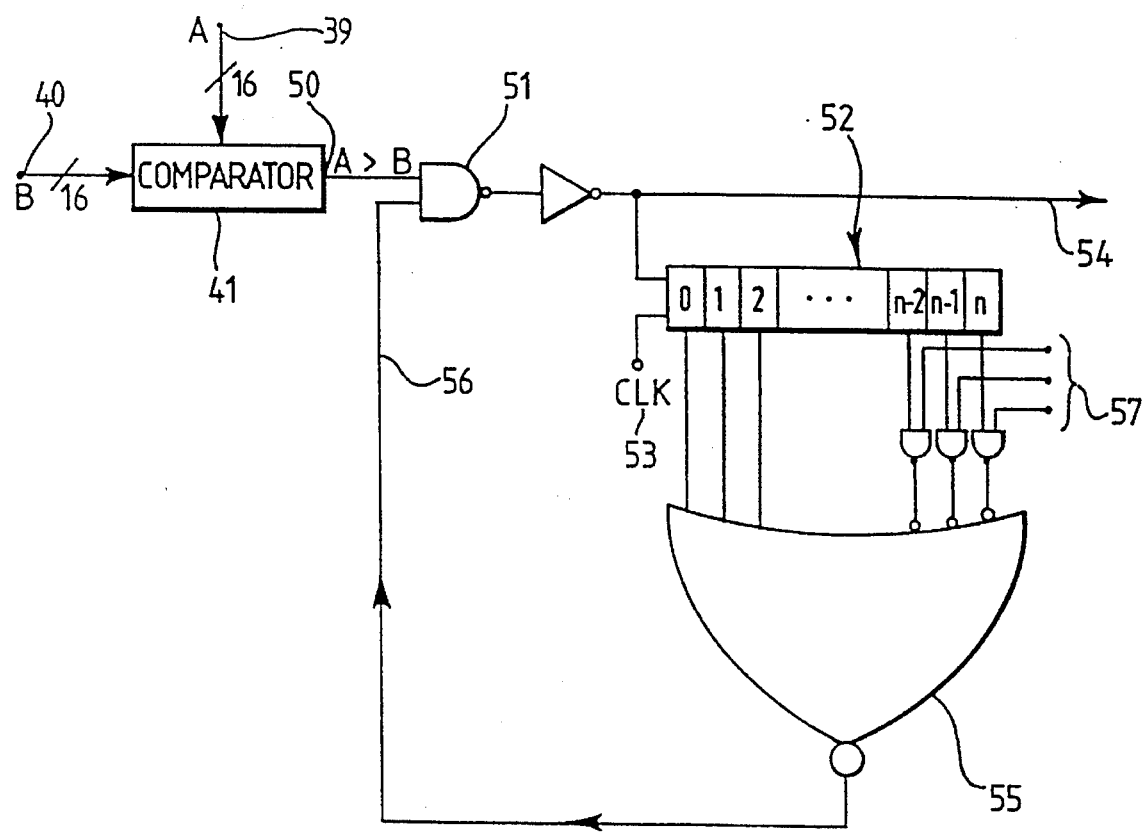
FIGS. 5 and 6 show two alternative circuits by means of which a refractory period can be modelled.

In the case of a short refractory period, the refractory period is modelled using a shift register as shown in FIG. 5. The comparator output 50 is high whenever the combined post-synaptic potential 39 is above the threshold (i.e. $A \geq B$). This signal is taken to a gate 51 and then to a shift register 52. The number of stages of the shift register is equal to the length of the refractory period in terms of unit clock periods of a clock input 53. Thus when output 50 is high and a refractory period is not in operation, output 50 is allowed to pass through the gate 51 and into the shift register 52. A pulse is generated at the neuron output 54 at this time. An OR-gate 55 is used to generate an inhibitory signal 56 whenever a logic '1' level is present in any of the stages of the shift register 52. This inhibitory signal prevents further signals 50 from reaching the neuron output 54. Until the logic '1' level has completely passed through the shift register 52, the gate 51 will remain inhibited. The refractory period is therefore the number of shift register stages used multiplied by the period of the clock input 53.

In order to make the refractory period variable, mask bits 57 are added to the circuit so that the length of the shift register may be effectively reduced. For example, if all the most-significant three mask bits 57 are at a '0' level, then the shift register 52 is effectively shortened by three bits.

Figure 6:
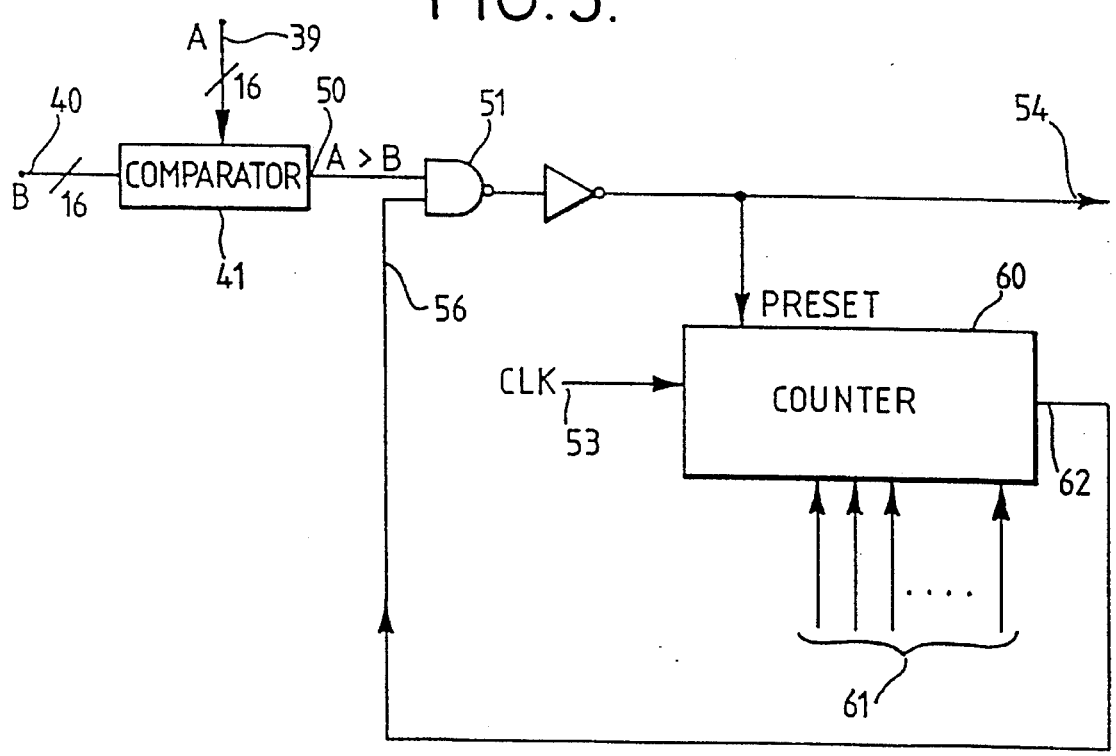

When the refractory period is very long, the shift register approach is unsuitable since a long shift register will be required. In such a case a counter can be utilised as shown in FIG. 6. The action of the circuit is similar that of FIG. 5 except that a counter 60 is used to inhibit gate 51. Thus when output 50 is high and a refractory period is not in operation, output 50 is allowed to pass through the gate 51 to the neuron output 54. At the same time the preset input of the counter 60 is activated so that the refractory period count 61 is loaded into the counter. Counter 60 operates as a down-counter and on each cycle of the refractory period clock 53, the counter is decremented. Whilst the counter contains a non-zero number, the output 62 is low, which inhibits gate 51. When the counter reaches a count of zero, output 62 goes high and stays high until output 50 goes high once more. When output 62 goes high, gate 51 is again enabled as the refractory period has ended.

TABLE 1

| INPUT | | firing |
|---|---|---|
| 5 | 6 | probability |
| 0 | 0 | .200 |
| 0 | 1 | .150 |
| 1 | 0 | .700 |
| 1 | 1 | .650 |

The firing probability decreases when input 6 in active. Input 6 is an inhibitory input.

TABLE 2

| INPUT | | firing |
|---|---|---|
| 5 | 6 | probability |
| 1 | 1 | .200 |
| 0 | 1 | .250 |
| 1 | 0 | .700 |
| 1 | 1 | .750 |

The firing probability increases when input 6 is active. Input 6 is an excitatory input.

We claim:

1. A neural device which comprises a plurality of neural elements each of which has a memory having a plurality of storage locations at each of which locations a number representing a probability is stored, means for addressing the storage locations, and means for causing to appear at an output of the neural element, when the storage locations are addressed, an element output signal, the probability of the element output signal having a given one of first and second values being determined by the number stored at the addressed location, the neural elements having their outputs connected in common to means for accumulating the element output signals thereof and for decaying the result of the accumulation; and thresholding means for receiving at its input the decayed result and generating an output signal at its output when the said decayed result exceeds a predetermined level.

2. A device according to claim 1, wherein the means for decaying comprises a voltage decay circuit.

3. A device according to claim 1, wherein the output of each of the neural elements is connected to the means for decaying via a resistor.

4. A device according to claim 3, wherein the resistor connected to each neural element is variable.

5. A device according to claim 1, wherein the addressing means of at least some of the neural elements comprises a plurality of address lines.

6. A device according to claim 1, comprising means for inhibiting a device output signal during a refractory period following a previous device output signal.

7. A device according to claim 6, wherein the inhibiting means comprises a shift register, each device output signal passing to the device output via the shift register.

8. A device according to claim 7, wherein the shift register has an effective length and is provided with a mask bit input for varying the effective length of the shift register.

9. A device according to claim 6, wherein the inhibiting means comprises a clock pulse generator for generating clock pulses and a counter for counting the clock pulses, the counter serving to inhibit the device output signal for a period determined by that required to count a predetermined number of the clock pulses.

10. A device according to claim 1, wherein the thresholding means generates an output pulse whenever the said decayed result goes from a value less than the predetermined level to a value more than the predetermined level.

* * * * *